(12) United States Patent
Xie et al.

(10) Patent No.: US 11,115,418 B2
(45) Date of Patent: Sep. 7, 2021

(54) REGISTRATION AND AUTHORIZATION METHOD DEVICE AND SYSTEM

(71) Applicant: CLOUDMINDS (SHENZHEN) ROBOTICS SYSTEMS CO., LTD., Shenzhen (CN)

(72) Inventors: Hui Xie, Shenzhen (CN); Jian Wang, Shenzhen (CN)

(73) Assignee: CLOUDMINDS (SHANGHAI) ROBOTICS CO., LTD., Shanghai (CN)

( * ) Notice: Subject to any disclaimer, the term of this patent is extended or adjusted under 35 U.S.C. 154(b) by 71 days.

(21) Appl. No.: 16/315,391

(22) PCT Filed: Dec. 23, 2016

(86) PCT No.: PCT/CN2016/111857
§ 371 (c)(1),
(2) Date: Jan. 4, 2019

(87) PCT Pub. No.: WO2018/112946
PCT Pub. Date: Jun. 28, 2018

(65) Prior Publication Data
US 2019/0312877 A1    Oct. 10, 2019

(51) Int. Cl.
*H04L 29/06* (2006.01)
*H04L 9/32* (2006.01)

(52) U.S. Cl.
CPC .......... *H04L 63/102* (2013.01); *H04L 9/3226* (2013.01); *H04L 9/3236* (2013.01);
(Continued)

(58) Field of Classification Search
CPC ....... H04L 63/102; H04L 63/10; H04L 63/08; H04L 9/3226; H04L 9/3236;
(Continued)

(56) References Cited

U.S. PATENT DOCUMENTS 9,514,293 B1    12/2016 Moritz et al.
9,813,400 B2 *  11/2017 Ross .................. H04L 63/0815
(Continued)

FOREIGN PATENT DOCUMENTS

CN    101350710 A    1/2009
CN    103841557 A    6/2014
(Continued)

OTHER PUBLICATIONS

Zhou et al.; "Authentication, Authorization, and Accounting for Real-Time Secondary Market Services", 2005 IEEE, pp. 1005-1009. (Year: 2005).*
(Continued)

*Primary Examiner* — Matthew Smithers
(74) *Attorney, Agent, or Firm* — Osha Bergman Watanabe & Burton LLP

(57) ABSTRACT

A registration and authorization method, device and system is used for solving the technical problem of relatively low safety of the existing authorization technology. The method is applied to an authorization server, the authorization server is a node in a blockchain network and stores a blockchain composed of a plurality of blocks, each block is used for storing authorization information, and the method comprises: receiving a registration request message sent by a user device, wherein the registration request message includes identification information, and the identification information is used for performing identity verification on a user; assigning authorization information to the user, wherein the authorization information is used for indicating a service that the user can access; and writing the identification information and the authorization information into the blocks of the blockchain through the authorization server.

17 Claims, 4 Drawing Sheets

(52) U.S. Cl.
CPC .............. *H04L 63/08* (2013.01); *H04L 63/10* (2013.01); *H04L 63/126* (2013.01); *H04L 2209/38* (2013.01)

(58) Field of Classification Search
CPC . H04L 63/126; H04L 2209/38; H04L 9/3239; G06F 21/30; G06F 21/64
See application file for complete search history.

(56) References Cited

U.S. PATENT DOCUMENTS

| | | | | |
|---|---|---|---|---|
| 10,581,615 | B2* | 3/2020 | Xie | H04L 9/0637 |
| 2009/0089866 | A1* | 4/2009 | Yato | H04L 63/083 726/6 |
| 2012/0110646 | A1* | 5/2012 | Ajitomi | H04L 63/10 726/4 |
| 2014/0270401 | A1* | 9/2014 | Irwin | G06K 9/00483 382/115 |
| 2016/0328713 | A1* | 11/2016 | Ebrahimi | G06F 21/645 |
| 2017/0116693 | A1* | 4/2017 | Rae | H04L 9/3236 |
| 2017/0177855 | A1* | 6/2017 | Costa Faidella | H04L 9/3231 |
| 2018/0091524 | A1* | 3/2018 | Setty | H04L 9/0643 |
| 2019/0124070 | A1* | 4/2019 | Engan | H04L 63/0807 |
| 2019/0173854 | A1* | 6/2019 | Beck | H04L 9/3239 |
| 2019/0219391 | A1* | 7/2019 | Haldenby | H04L 9/3263 |
| 2019/0253251 | A1* | 8/2019 | Kobayashi | H04L 9/3213 |
| 2019/0334884 | A1* | 10/2019 | Ross | H04L 63/0442 |
| 2019/0342085 | A1* | 11/2019 | Kube | H04L 9/3247 |
| 2020/0128024 | A1* | 4/2020 | Kuramkote | H04L 67/327 |
| 2020/0226285 | A1* | 7/2020 | Bulleit | G06F 21/33 |
| 2020/0244470 | A1* | 7/2020 | Ruckriemen | H04L 9/3236 |

FOREIGN PATENT DOCUMENTS

| | | |
|---|---|---|
| CN | 105262751 A | 1/2016 |
| CN | 105264487 A | 1/2016 |
| CN | 105391696 A | 3/2016 |
| CN | 105701372 A | 6/2016 |
| EP | 1943856 B1 | 3/2010 |
| JP | 2018-055203 A | 4/2018 |
| WO | 2016-090095 A1 | 6/2016 |

OTHER PUBLICATIONS

Xu et al.; "BlendCAC: A BLockchain-ENabled Decentralized Capability-based Access Control for IoTs", 2018, IEEE, pp. 1027-1034. (Year: 2018).*
International Search Report and Written Opinion Issued in Corresponding PCT Application No. PCT/CN2016/111857, dated Sep. 28, 2017 (8 Pages with English Translation of International Search Report).
Chinese Search Report issued in corresponding Chinese Application No. 201680003231.5, dated Sep. 25, 2019 (10 pages).
Ivica Aracic: "Ethereum Usecase: Online Identitätsprofung—Blockchainers", Mar. 29, 2016 (Mar. 29, 2016), p. 1-6, XP055424742, Retrieved from the Internet: URL: http://blockchainers.org/index.php/2016/03/29/ethereum-usecase-online-identity-check/ (6 pages).
Anonymous: "Blockchain ID", Jan. 1, 2015 (Jan. 1, 2015), XP055311310, Retrieved from the internet: URL: https://github.com/Blockstack/blockchain-id/wiki (17 pages).
Muneeb Ali + et al: "Blockstack; A Global Naming and Storage System Secured by Blockchains", USENIX, USENIX, The Advanced Computing Systems Association, Jun. 22, 2016 (Jun. 22, 2016), pp. 188-201, XP061024971, Retrieved from the Internet: URL: https://www.usenix.org/sites/default/files/atc16_full_proceedings_interior.pdf (14 pages).
European Search Report in corresponding European Application No. 16924533.9-1218, dated Nov. 28, 2019 (6 pages).
Decision to Grant in corresponding Japanese Application No. 2018-563628, dated May 24, 2019 (5 pages).

* cited by examiner

REGISTRATION AND AUTHORIZATION METHOD DEVICE AND SYSTEM

CROSS-REFERENCE TO RELATED APPLICATIONS

This application claims the benefit of PCT application No. PCT/CN2016/111857 filed on Dec. 23, 2016 and Chinese publication No. CN107079036A filed on May 12, 2017, the contents of which are incorporated herein by reference.

Field of the Invention

The present disclosure relates to the field of network communications, in particular to a registration and authorization method, device and system.

BACKGROUND OF THE INVENTION

For users in an already registered computer or network system, the services that they can access may be different. Authorization is the process of verifying the identity of a user and determining which services the user may use after the verification is passed.

The existing authorization technology generally requires the participation of a trusted third party. The working process is as follows: a user logs in an access gateway and provides a password or a certificate, etc. as user identification, and the access gateway transfers the user identification to an authorization server. After the authorization server verifies the user identity, a verification success message and a service that the user can access or a verification failure message are/is returned to the access gateway according to the verification result. If the verification is passed, the access gateway allows the user to access the corresponding accessible service.

It can be seen from the above process that, if the authorization server as a centralized server is hacked, or is actively tampered by an entity providing the authorization server, the legitimate rights and benefits of the interested parties will be infringed. From this, it can be seen that, the existing authorization technology has the problem of low safety.

SUMMARY OF THE INVENTION

The present disclosure aims at providing a registration and authorization method, device and system for solving the technical problem of relatively low safety of the existing authorization technology.

In order to achieve the above object, a first aspect of the present invention provides a registration method, the method is applied to an authorization server which is a node in a blockchain network and stores a blockchain composed of a plurality of blocks, each block is used for storing authorization information, and the method includes:

receiving a registration request message sent by a user device, wherein the registration request message includes identification information, and the identification information is used for performing identity verification on a user;

assigning authorization information to the user, wherein the authorization information is used to indicate a service that the user can access; and writing the identification information and the authorization information into the blocks of the blockchain through the authorization server.

A second aspect of the present invention provides an authorization method, the method is applied to an access server which is a node in a blockchain network, and the method includes:

receiving an access request message sent by a user device, wherein the access request message includes user identity information;

inquiring identification information and authorization information of the user according to the user identity information through the access server;

performing identity verification on the user according to the identification information; and allowing the user to access the designated service according to the authorization information after the verification is passed.

A third aspect of the present invention provides a registration device, the registration device is applied to an authorization server which is a node in a blockchain network and stores a blockchain composed of a plurality of blocks, each block is used for storing authorization information, and the registration device comprises:

a message receiving unit for receiving a registration request message sent by a user device, wherein the registration request message includes identification information, and the identification information is used for performing identity verification on a user;

an authority assigning unit for assigning authorization information to the user, wherein the authorization information is used to indicate a service that the user can access; and a blockchain writing unit for writing the identification information and the authorization information into the blocks of the blockchain through the authorization server.

A fourth aspect of the present invention provides an authorization device, the authorization device is used for an access server which is a node in a blockchain network, and the authorization device comprises:

a message receiving unit for receiving an access request message sent by a user device, wherein the access request message includes user identity information;

a blockchain inquiring unit for inquiring identification information and authorization information of the user in a blockchain according to the user identity information through the access server;

an identity verification unit for performing identity verification on the user according to the identification information; and an access authorizing unit for allowing the user to access the designated service according to the authorization information after the verification of the user by the identity verification unit is passed.

A fifth aspect of the present invention provides an authorization server which is a node in a blockchain network and stores a blockchain composed of a plurality of blocks, each block is used for storing authorization information, and the authorization server comprises:

a processor, a communication interface, a memory and a communication bus; the processor, the communication interface and the memory communicate with each other through the communication bus;

the memory is used for storing application programs;

the processor is used for performing the application program to implement the method of the first aspect.

A sixth aspect of the present invention provides an access server, the access server is a node in a blockchain network, and the access server comprises:

a processor, a communication interface, a memory and a communication bus; the processor, the communication interface and the memory communicate with each other through the communication bus;

the memory is used for storing application programs;

the processor is used for performing the application program to implement the method of the second aspect.

A seventh aspect of the present invention provides an authorization system, and the system comprises:

an authorization server and an access server, wherein the authorization server is a node in a blockchain network, the access server is a node in the blockchain network, and the access server is connected with a server providing network service;

the authorization server is used for performing the method of the first aspect; and the access server is used for performing the method of the second aspect.

A ninth aspect of the present invention provides a computer readable storage medium, the computer readable medium is used for storing a computer program, wherein the computer program comprises instructions for performing the method of the first aspect.

A tenth aspect of the present invention provides a computer readable storage medium, the computer readable medium is used for storing a computer program, wherein the computer program comprises instructions for performing the method of the second aspect.

By adopting the above technical solutions, the authorization server writes the identity information and the authorization information of the user into the blockchain. In this way, when the access server receives the access request message sent by the user device, the identification information stored in the blockchain may be used to perform the identity verification, and after the verification is passed, the user is allowed to access the designated service according to the authorization information. The detrusting of the blockchain enables the authorization process to require no endorsement by a trusted third party. At the same time, the decentralization of the blockchain makes it impossible for any individual or entity to tamper with the relevant information of the user, thus ensuring the safety and reliability of the authorization.

BRIEF DESCRIPTION OF THE DRAWINGS

In order to illustrate the embodiments of the present invention or the technical solutions in the prior art more clearly, the drawings which need to be used in the description of the embodiments will be briefly described below. It is obvious that the drawings in the following description are about some embodiments of the present invention. For those of ordinary skill in the art, other drawings may also be obtained according to these drawings without creative labor.

DETAILED DESCRIPTION OF THE EMBODIMENTS

Figure 1:
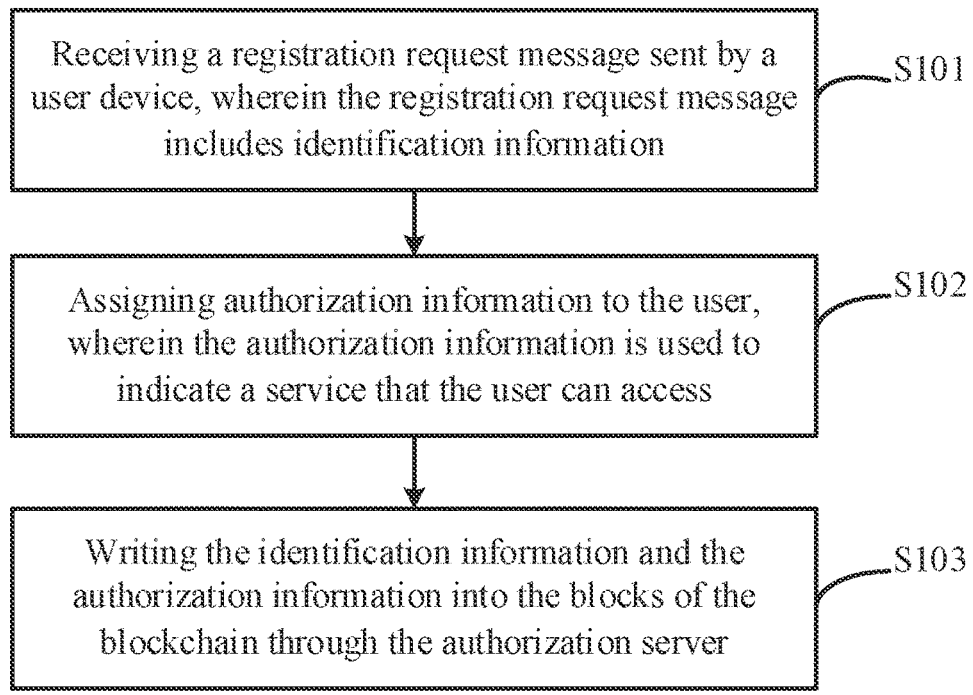
FIG. 1 is a schematic flowchart of a registration method provided by an embodiment of the present invention.

In order to enable the objects, the technical solutions and the advantages of the embodiments of the present invention to become clearer, the technical solutions in the embodiments of the present invention will be clearly and completely described below with reference to the accompanying drawings in the embodiments of the present invention. Obviously, the described embodiments are only one part of the embodiments of the present invention rather than all of the embodiments. Based on the embodiments in the present invention, all the other embodiments obtained by those of ordinary skill in the art without creative labor are still within the scope of the claimed present invention.

In order to enable those of skill in the art to understand the technical solutions provided by the embodiments of the present invention more easily, the related technologies involved will be first briefly introduced below.

A blockchain is a decentralized distributed database system in which all nodes in a blockchain network participate in maintenance. It is composed of a series of data blocks generated on the basis of cryptography, and each data block is a block in the blockchain. According to the sequence of generation time, the blocks are linked together orderly to form a data chain, which is vividly called the blockchain. The blockchain generates and verifies the protocol by the special blocks and transactions and has the safety features of unchangeability, unforgeability and full traceability.

The description of the related concepts involved in the blockchain technology is as follows:

User identity: the user identity in a blockchain is represented by a public key, a private key corresponding to the public key is mastered by the user and not issued to a network, the public key becomes an "address" after specific hashing and encoding, and the "address" represents the user and can be issued at will.

Blockchain data writing: the node of the blockchain writes data to the blockchain by issuing a transaction to the blockchain network. The transaction contains a signature of the transaction by the user with his or her private key to verify the identity of the user. The transaction is recorded into a produced new block by a "miner" (a blockchain node performing a consensus competition mechanism of the blockchain) and then issued to the blockchain network, and after the transaction is verified and accepted by other blockchain nodes, transaction data is written into the blockchain.

The blockchain has the following features:

Decentralization: the entire blockchain system has no centralized hardware or management organism. The rights and obligations between any nodes are equal, and the damage or loss of any node will not affect the operation of the entire system. Thus, the blockchain may be considered as having great robustness.

De-trusting: the data exchange between the nodes participating in the entire blockchain system does not require mutual trust. The operating rules of the entire system are public and transparent, and all data contents are also public, so the nodes cannot defraud other nodes within the rule scope and the time range designated by the system.

An embodiment of the present invention provides a registration method based on the blockchain technology, the method is applied to an authorization server, wherein the authorization server is a node in a blockchain network, as shown in FIG. 1, and the method comprises:

S101. Receiving a registration request message sent by a user device, wherein the registration request message includes identification information.

Wherein, the identification information is used for performing identity verification on a user.

S102. Assigning authorization information to the user, wherein the authorization information is used to indicate a service that the user can access.

It is worth noting that an authorization server may assign authorization information to the user according to pre-configured authorization rules, so as to control the server that the user can access. For example, in the specific implementation process, the authorization server may design reasonable network access authorities for the users with different identities, different access places, different access ways and different safe states, which are not limited by the present invention.

S103. Writing the identification information and the authorization information into the blocks of the blockchain through the authorization server.

By referring to the above description of writing of data of the blockchain, wherein the authorization server is a blockchain node in the blockchain network to ensure that the authorization server at least has the function of participating in blockchain transactions. As the node in the blockchain network, the authorization server stores the blockchain composed of a plurality of blocks, and each block is used for storing authorization information. It is worth noting that the authorization server may not participate in mining. In this case, in the above step S103, the authorization server broadcasts the identification information and the authorization information to other nodes in the blockchain network for being written by other nodes when the nodes generate the blocks. The authorization server may also participate in mining. In this case, the authorization server may write the identification information and the authorization information into the block when it generates the block to obtain block writing authority, and may also broadcast the identification information and the authorization information to other nodes in the blockchain network for being written by other nodes when the nodes generate the blocks.

By adopting the above method, as a node in the blockchain network, an access server may utilize the identification information stored in the blockchain to perform the identity verification on access when it receives an access request message sent by the user device, and after the verification is passed, the user is allowed to access the designated service according to the authorization information. The detrusting of the blockchain achieves that the authorization process needs no endorsement by a trusted third party. At the same time, the decentralization of the blockchain makes it impossible for any individual or entity to tamper with the relevant information of the user, thus ensuring the safety and reliability of the authorization.

Figure 2:
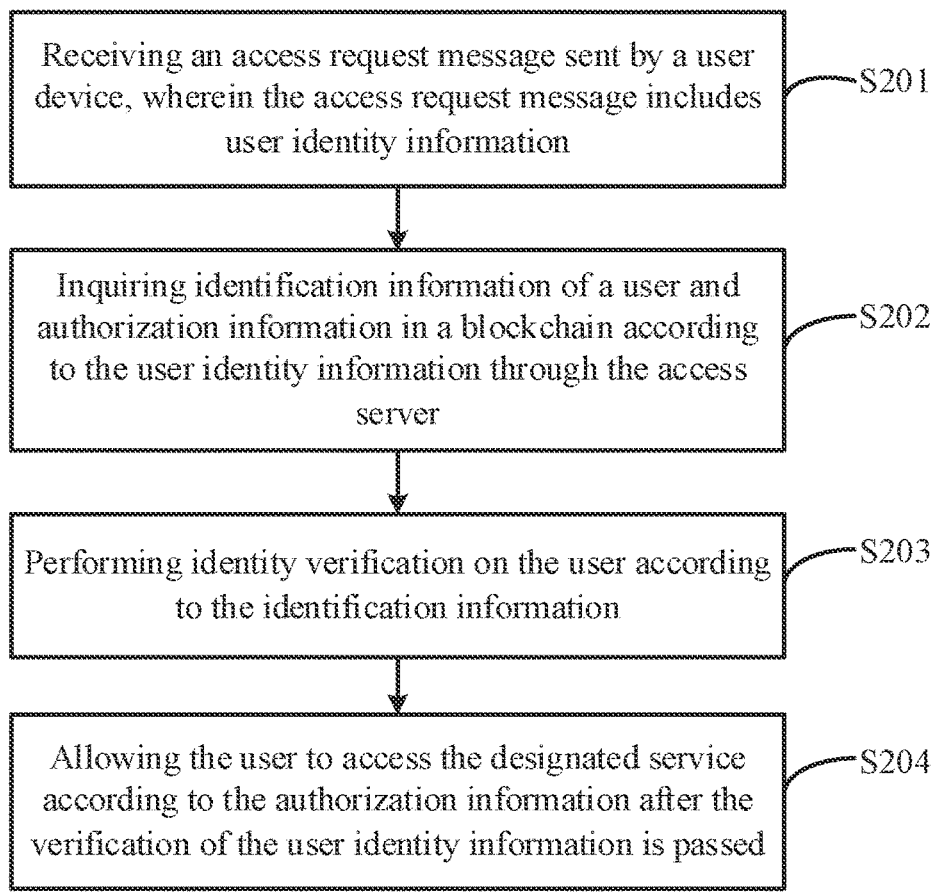
FIG. 2 is a schematic flowchart of an authorization method provided by an embodiment of the present invention.

Further, an embodiment of the present invention also provides an authorization method, the method is applied to an access server, the access server is a node in a blockchain network, as shown in FIG. 2, and the method comprises:

S201. Receiving an access request message sent by a user device, wherein the access request message includes user identity information.

S202. Inquiring identification information and authorization information of the user in a blockchain according to the user identity information through the access server.

The access server is a blockchain node in the blockchain network to ensure that the access server at least has the function of inquiring the blockchain. In a possible implementation way of an embodiment of the present invention, the access server and the authorization server in the registration method as shown in FIG. 1 may be the same server.

In addition, by referring to the description of the user identity in the blockchain, it is worth noting that there is no one-to-one correspondence between the user identity and the blockchain node. The user may use his/her own private key on anyone blockchain node. In this way, the access server may use the private key to seek any one block in the blockchain to inquire and obtain the identification information and the authorization information of the user. If the access server doesn't find the identification information and the authorization information of the user in the blockchain, an access failure message is returned to the user device.

S203. Performing identity verification on the user according to the identification information.

S204. Allowing the user to access the designated service according to the authorization information after the verification of the user identity information is passed.

In this way, compared with the prior art in which the access server relies on a trusted third party to verify the user after receiving the access request message of the user device, the authorization method provided in the embodiment of the present invention has the advantages that as the blockchain network has no centralized hardware or management organism, the rights and obligations between any nodes are equal, and the damage or loss of any node will not affect the operation of the entire system. Thus, the authorization process is safer and more reliable.

The verification of the user according to the identification information and the user identity information will be described specifically below:

Way 1. In the above step S101, the identification information may be a ciphertext of a password hash value.

In specific implementation, the identification information may be obtained by encrypting a plaintext of the password hash value with a public key of the access server and may also be obtained by encrypting the plaintext of the password hash value with a preset key by adopting a symmetric encryption algorithm, wherein the preset key may be stored and used independently by the authorization server and the access server.

In this way, in the step S203, the user identity information may include a user name and the password hash value, and after the access server receives the user identity information, the ciphertext of the password hash value stored on the blockchain is found by the user name. Further, the plaintext of the password hash value is obtained by decrypting the identification information through its own private key or the preset key, if the plaintext of the password hash value obtained by the decryption is consistent with the password hash value in the user identity information, it is indicated that the user identity verification is passed, and if not, it is indicated that the user identity verification is not passed.

Way 2. In the above step S101, the identification information may be a user public key. In the step S203, the user identity information may be the user public key, and after determining that the user public key and the authorization information are recorded in the blockchain according to the user public key, the access server may send instruction information instructing the user to provide identification to the user device, receive signature information of user private key signature sent by the user device according to the instruction information and perform signature verification on the signature information, if the signature verification succeeds, it is indicated that the user identity verification is passed, and if the signature verification fails, it is indicated that the user identity verification fails.

The above is only an example. In specific implementation, other ways may be adopted to verify the user identity, and this aspect is not limited by the present invention.

In a possible implementation way of an embodiment of the present invention, the registration method as shown in FIG. 1 also includes that: the authorization server receives an update message, the update message is used for updating the authorization information corresponding to the identification information, and the identification information and the updated authorization information are written into the blocks of the blockchain through the authorization server.

That is to say, according to the authorization rules configured by the authorization server, if the user satisfies the condition of changing the authorization information, the authorization server may change the authorization scope of the user according to the control of the management system. Thus, a plurality of blocks storing the identification information and the authorization information of the user may exist in the blockchain. Thus, in the above step S202, if a plurality of blocks storing the identification information and the authorization information of the user are inquired in the blockchain through the access server by utilizing the user identity information, acquiring the identification information and the authorization information of the user from the latest block in the plurality of the blocks to ensure that the access server allows the user to access network services according to the latest authorization information.

Figure 3:
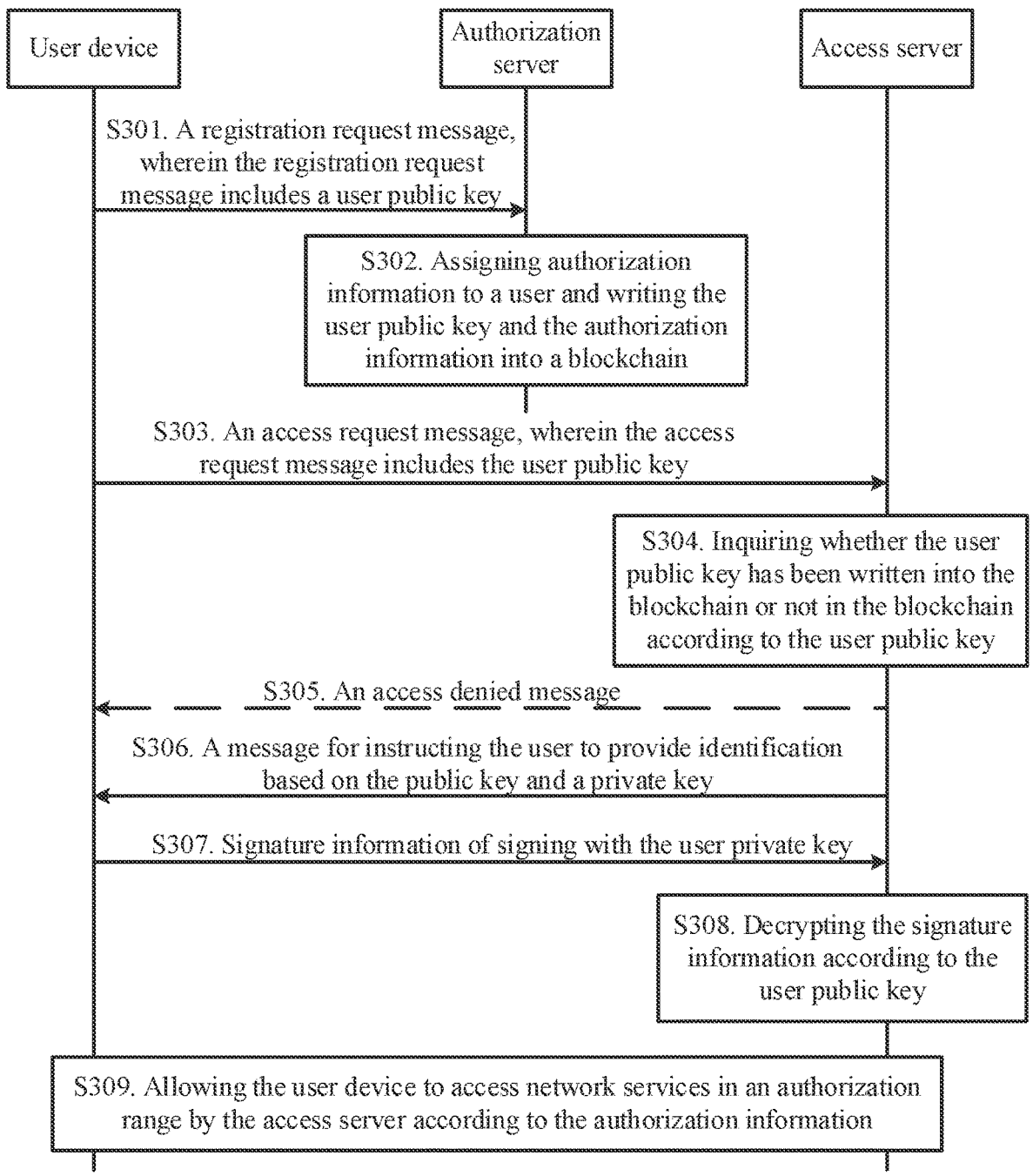
FIG. 3 is a schematic flowchart of a registration and authorization method provided by an embodiment of the present invention.

In order to enable those of skill in the art to understand the technical solutions provided by the embodiments of the present invention better, the registration and authorization method provided by an embodiment of the present invention will be described in detail as an example, as shown in FIG. 3, and the method comprises:

S301. A user device sends a registration request message to an authorization server, wherein the registration request message includes a user public key.

S302. An authorization server assigns authorization information to a user and writes the user public key and the authorization information into a blockchain.

S303. A user device sends an access request message to an access server, wherein the access request message includes the user public key.

S304. The access server inquires whether the user public key has been written into the blockchain or not in the blockchain according to the user public key.

Further, if it is inquired that the user public key has not been written into the blockchain in the blockchain according to the user public key, the step S305 is performed; and if it is inquired that the user public key has been written into the blockchain in the blockchain according to the user public key, the step S306 and the subsequent steps are performed.

S305. The access server returns an access denied message to the user device.

S306. The access server sends a message for instructing the user to provide identification based on the public key and a private key to the user device.

S307. The user device sends signature information of the user private key signature to the access server.

S308. The access server performs signature verification on the signature information according to the user public key.

Further, if the signature verification fails, the step S305 is performed; and if the signature verification succeeds, the step S309 is performed.

S309. The access server allows the user device to access network services in an authorization range according to the authorization information.

By adopting the method, the detrusting of the blockchain enables the authorization process to require no endorsement by a trusted third party. At the same time, the decentralization of the blockchain makes it impossible for any individual or entity to tamper with the relevant information of the user, thus ensuring the safety and reliability of the authorization.

It is worth noting that the above method is only an example of using the user public key as the identification information, and in specific implementation, the identification information may also be a ciphertext of a password hash value. In addition, for the above method embodiment, for ease of description, the method is expressed as a series of action combinations. However, those skilled in the art should understand that the present invention is not limited by the described order of actions. Secondly, those of skill in the art should also understand that the embodiments described in the specification are all preferred embodiments, and the actions involved are not necessarily required by the present invention.

Figure 4:
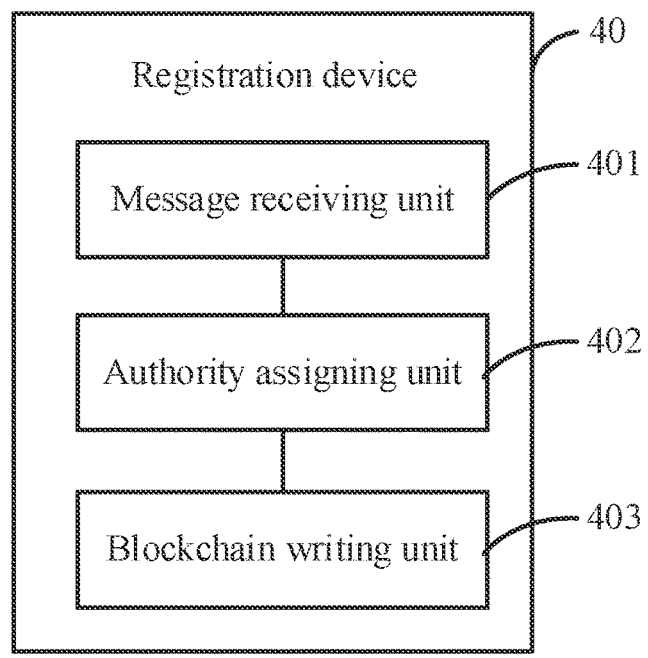
FIG. 4 is a schematic structural diagram of a registration device provided by an embodiment of the present invention.

An embodiment of the present invention further provides a registration device 40, the registration device 40 is applied to an authorization server which is a node in a blockchain network and stores a blockchain composed of a plurality of blocks, each block is used for storing authorization information, and the registration device 40 is used for implementing the registration method as shown in FIG. 1 provided in the above method embodiment, and as shown in FIG. 4, the registration device 40 comprises:

a message receiving unit 401 for receiving a registration request message sent by a user device, wherein the registration request message includes identification information, and the identification information is used for performing identity verification on a user;

an authority assigning unit 402 for assigning authorization information to the user, wherein the authorization information is used to indicate a service that the user can access; and a blockchain writing unit 403 for writing the identification information and the authorization information into the blocks of the blockchain through the authorization server.

By adopting the above registration device, the authorization server applying the registration device can write the identity information and the authorization information of the user into the blockchain. In this way, when the access server receives the access request message sent by the user device, the identification information stored in the blockchain may be used to perform the identity verification, and after the verification is passed, the user is allowed to access the designated service according to the authorization information. The detrusting of the blockchain achieves that the authorization process needs no endorsement by a trusted third party. At the same time, the decentralization of the blockchain makes it impossible for any individual or entity to tamper with the relevant information of the user, thus ensuring the safety and reliability of the authorization.

It is worth noting that the identification information is a ciphertext of a password hash value; or the identification information is a user public key. Specifically, reference may be made to way 1 and way 2 in the above method embodiment, which will not be repeated herein.

Optionally, the message receiving unit 401 is also used for receiving an update message, the update message is used for updating the authorization information corresponding to the identification information; and the blockchain writing unit 403 is also used for writing the identification information and the updated authorization information into the blocks of the blockchain through the authorization server.

That is to say, according to the authorization rules configured by the authorization server, if the user satisfies the condition of changing the authorization information, the authorization server may change the authorization scope of the user according to the control of the management system. Thus, a plurality of blocks storing the identification information and the authorization information of the user may exist in the blockchain.

Those skilled in the art may clearly know that, for convenience and brevity of the description, the above division of the various functional units is only used as an example for description. In actual applications, the above function assignment may be completed by different functional units as needed, namely the internal structure of the device may be divided into different functional units to achieve all or part of the functions described above. For the above specific working process describing the functional units, reference may be made to the corresponding process in the above-mentioned method embodiment, and the details will not be repeated herein.

In addition, there may be a variety of ways for physical implementation of the above functional units. For example, in an exemplary embodiment, the registration device 40 may be implemented by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), controllers, micro-controllers, microprocessors or other electronic elements, so as to perform the method provided by FIG. 1.

Figure 5:
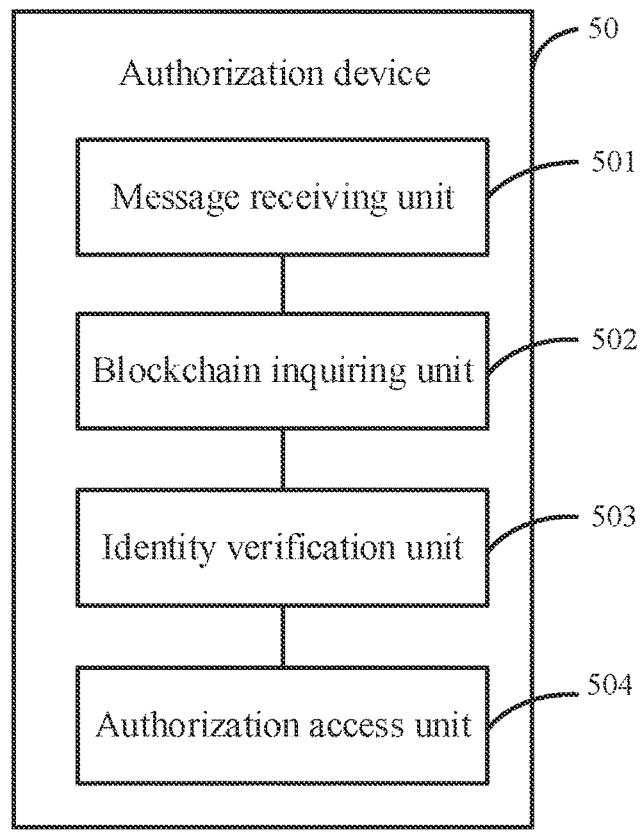
FIG. 5 is a schematic structural diagram of an authorization device provided by an embodiment of the present invention.

An embodiment of the present invention further provides an authorization device 50, the authorization device 50 is applied to an access server, the access server is a node in a blockchain network, the authorization device 50 is used for implementing the authorization method as shown in FIG. 2 provided by the above method embodiment, and as shown in FIG. 5, the authorization device 50 comprises:

a message receiving unit 501 for receiving an access request message sent by a user device, wherein the access request message includes user identity information;

a blockchain inquiring unit 502 for inquiring identification information and authorization information of the user in a blockchain according to the user identity information through the access server;

an identity verification unit 503 for performing identity verification on the user according to the identification information; and an access authorizing unit 504 for allowing the user to access the designated service according to the authorization information after the verification of the user by the identity verification unit is passed.

The detrusting of the blockchain enables the authorization process to require no endorsement by a trusted third party. At the same time, the decentralization of the blockchain makes it impossible for any individual or entity to tamper with the relevant information of the user, thus ensuring the safety and reliability of the authorization.

Optionally, the blockchain inquiring unit 502 is used for:
when a plurality of blocks storing the identification information and the authorization information of the user are inquired in the blockchain according to the user identity information, acquiring the identification information and the authorization information of the user from the latest block in the plurality of the blocks.

Optionally, the identification information is a ciphertext of a password hash value, and the user identity information includes a user name and the password hash value. The blockchain inquiring unit 502 is used for: seeking the corresponding ciphertext of the password hash value and the authorization information on the blockchain through the access server by utilizing the user name; and the identity verification unit 503 is used for: decrypting the ciphertext of the password hash value and determining that the verification is passed if a plaintext obtained by decryption is consistent with the password hash value in the user identity information.

Optionally, the identification information is a user public key. The identity verification unit 503 is used for: sending instruction information instructing the user to provide identification to the user device; receiving signature information of user private key signature sent by the user device according to the instruction information; and performing signature verification on the signature information according to the user public key, and if the signature verification succeeds, determining that the identity verification is passed.

In specific implementation, the access server may be positioned at the boundary of a network which needs to be accessed by the user device, and the network may be Internet or a local area network. After the user device passes verification, the user device can access the network and access all services of the network. The network services may also be provided by a cloud server, and after the user device passes the identity verification, the user device may access the corresponding service in the authorization range.

It should be clearly understood by those skilled in the art that, for convenience and brevity of the description, for the specific working process of each unit of the access server described above, reference may be made to the corresponding process in the above-mentioned method embodiment, and the details will not be repeated herein.

In addition, the above division of the modules composing the access server is only one logical function division, and other division ways may also be adopted in actual implementation. Furthermore, the physical implementation of the various units may also adopt a variety of ways, which is not limited by the present invention.

Figure 6:
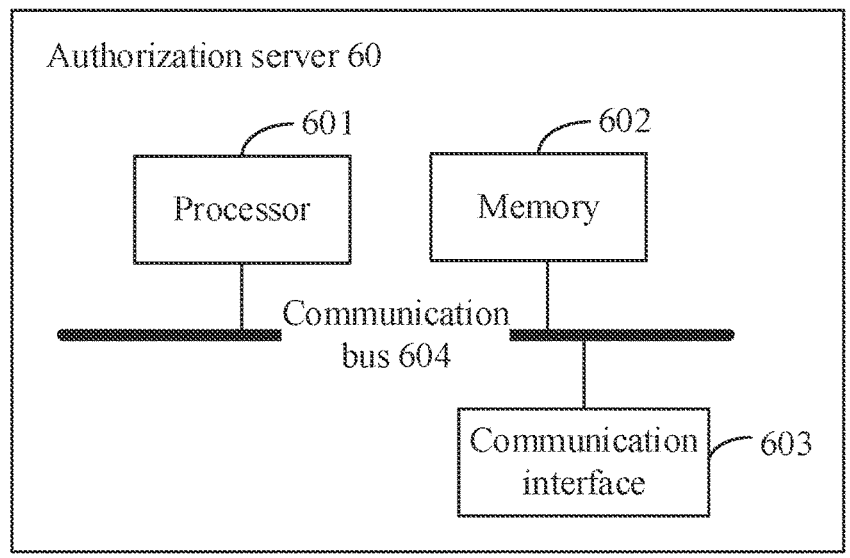
FIG. 6 is a schematic structural diagram of another authorization server provided by an embodiment of the present invention.

An embodiment of the present invention further provides an authorization server 60, the authorization server 60 is a node in a blockchain network, and as shown in FIG. 6, the authorization server 60 comprises:

a processor 601, a communication interface 602, a memory 603 and a communication bus 604; and the processor 601, the communication interface 602 and the memory 603 communicate with each other through the communication bus 604.

The processor 601 may be a multi-core central processing unit (CPU) or an ASIC (Application Specific Integrated Circuit) or one or more integrated circuits configured to implement the embodiment of the present invention.

The memory 603 is used for storing program codes, and the program codes include computer operating instructions and a network flow diagram. The memory 603 may carry a high-speed RAM memory and may also include a non-volatile memory, such as at least one magnetic disk storage.

The communication interface 602 is used for implementing the connection and communication between these devices.

The processor 601 performs the program codes, and the program codes are used for implementing the following method during operation:

receiving a registration request message sent by a user device, wherein the registration request message includes identification information, and the identification information is used for performing identity verification on a user;

assigning authorization information to the user, wherein the authorization information is used to indicate a service that the user can access; and writing the identification information and the authorization information into the blocks of the blockchain.

Optionally, the identification information is a ciphertext of a password hash value; or the identification information is a user public key.

Optionally, the method further comprises:

receiving an update message, wherein the update message is used for updating the authorization information corresponding to the identification information; and writing the identification information and the updated authorization information into the blocks of the blockchain.

By adopting the above authorization server, the authorization server writes the identity information and the authorization information of the user into the blockchain. In this way, when the access server receives the access request message sent by the user device, the identification information stored in the blockchain may be used to perform the identity verification, and after the verification is passed, the user is allowed to access the designated service according to the authorization information. The detrusting of the blockchain achieves that the authorization process needs no endorsement by a trusted third party. At the same time, the decentralization of the blockchain makes it impossible for any individual or entity to tamper with the relevant information of the user, thus ensuring the safety and reliability of the authorization.

Figure 7:
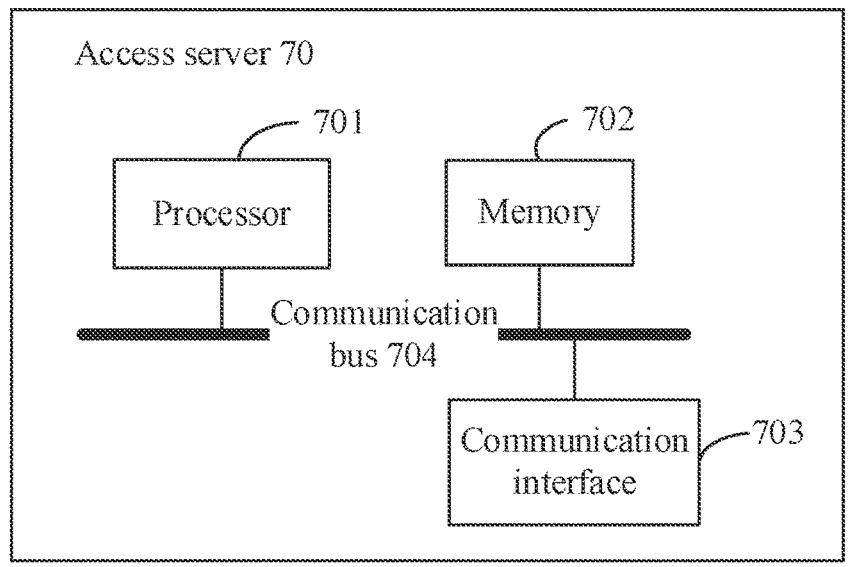
FIG. 7 is a schematic structural diagram of another access server provided by an embodiment of the present invention.
Figure 8:
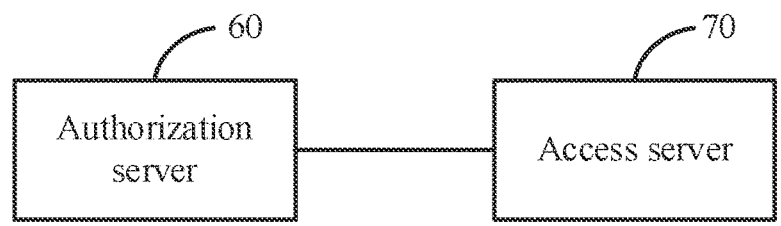
FIG. 8 is a schematic structural diagram of an authorization system provided by an embodiment of the present invention.

An embodiment of the present invention further provides an access server 70, the access server 70 is a node in a blockchain network, and as shown in FIG. 7, the access server 70 comprises:

a processor 701, a communication interface 702, a memory 703 and a communication bus 704, wherein the processor 701, the communication interface 702 and the memory 703 communicate with each other through the communication bus 704.

The processor 701 may be a multi-core central processing unit (CPU) or an ASIC (Application Specific Integrated Circuit) or one or more integrated circuits configured to implement the embodiment of the present invention.

The memory 703 is used for, storing program codes, and the program codes include computer operating instructions and a network flow diagram. The memory 703 may carry a high-speed RAM memory and may also include a non-volatile memory, such as at least one magnetic disk storage.

The communication interface 702 is used for implementing the connection and communication between these devices.

The processor 701 performs the program codes, and the program codes are used for implementing the following method during operation:

receiving an access request message sent by a user device, wherein the access request message includes user identity information;

inquiring identification information and authorization information of the user in a blockchain according to the user identity information;

performing identity verification on the user according to the identification information; and allowing the user to access the designated service according to the authorization information after the verification is passed.

Optionally, inquiring the identification information and the authorization information of the user in the blockchain according to the user identity information comprises:

when a plurality of blocks storing the identification information and the authorization information are found after inquiry in the blockchain according to the user identity information, acquiring the identification information and the authorization information of the user from the latest block in the plurality of blocks.

Optionally, the identification information is a ciphertext of a password hash value, the user identity information includes a password, and performing the identity verification on the user according to the identification information comprises:

calculating a hash value of the user identity information; and decrypting the user identity information, and determining that the verification is passed if a plaintext obtained by decryption is consistent with the user identity information.

Optionally, the identification information is a user public key, and performing the identity verification on the user according to the identification information comprises:

sending instruction information instructing the user to provide identification to the user device;

receiving user signature information sent by the user device according to the instruction information; and performing signature verification on the signature information according to the user public key, and determining that the identity verification is passed if the signature verification succeeds.

An embodiment of the present invention further provides an authorization system 80, the authorization system 80 comprises an authorization server 60 and an access server 70, wherein the authorization server 60 is a node in a blockchain network, the access server 70 is a node in the blockchain network, and the access server 50 is connected with a server providing network services. Specifically, for the authorization server 60, reference may be made to the description of FIG. 6, which will not be repeated herein. Specifically, for the access server 70, reference may be made to the description of FIG. 7, which will not be repeated herein.

In several embodiments provided by the application, it should be understood that, the disclosed system, device and method may be implemented in other ways. For example, the device embodiments described above are only illustrative. For example, the division of the units is only a logic functional division, and there may be additional division ways in actual implementation. For example, a plurality of units or components may be combined or may be integrated to another system, or some features may be omitted or may not be performed. In addition, the displayed or discussed mutual coupling or direct coupling or communication connection may be indirect coupling or communication connection through some interfaces, devices or units, and may be in electrical, mechanical or other forms.

The units illustrated as separate parts may or may not be physically separated. The parts displayed as units may or may not be physical units, namely may be positioned at one place, or may be distributed on a plurality of network units. The object of the scheme of the embodiment may be achieved by selecting part or all of the units according to actual needs.

In addition, the various functional units in the various embodiments of the present invention may be integrated into one processing unit, or each unit may exist physically separately, or two or more units may be integrated into one unit. The units integrated above may be implemented not only in a hardware form, but also in a form of hardware and software functional units.

The above integration unit implemented in the form of software functional units may be stored in a computer readable storage medium. The above software functional units are stored in a storage medium, including a number of instructions for enabling a computer device (which may be a personal computer, a server, or a network device, etc.) to perform some of the steps of the methods described in the various embodiments of the present invention. The above-mentioned storage media include: USB disks, mobile hard disks, random access memories (RAM), magnetic disks or compact disks and other media capable of storing data.

The above is only the detailed description of the present invention, but the protection scope of the present invention is not limited thereto. Changes or substitutions which can be easily conceived by those of skill in the art in the technical scope disclosed by the present invention should fall within the protection scope of the present invention. Therefore, the protection scope of the present invention is defined by the claims.

The invention claimed is:

1. A registration method applied to an authorization server which is a node in a blockchain network and stores a blockchain composed of a plurality of blocks, wherein each block is used for storing authorization information, the method comprising:
receiving a registration request message sent by a user device, wherein the registration request message includes identification information, and the identification information is used for performing identity verification on a user;
assigning authorization information to the user, wherein the authorization information is used to indicate a service that the user can access; and
writing the identification information and the authorization information into the blocks of the blockchain through the authorization server.

2. The method according to claim 1, wherein the identification information is a ciphertext of a password hash value; or the identification information is a user public key.

3. The method according to claim 1, further:
receiving an update message, wherein the update message is used for updating the authorization information corresponding to the identification information; and
writing the identification information and the updated authorization information into the blocks of the blockchain through the authorization server.

4. An authorization method applied to an access server which is a node in a blockchain network, the method comprising:
receiving an access request message sent by a user device, wherein the access request message includes user identity information;
inquiring identification information and authorization information of the user in the blockchain according to the user identity information through the access server;
performing identity verification on the user according to the identification information; and
allowing the user to access the designated service according to the authorization information after the verification is passed,
wherein the identification information is a user public key, and performing identity verification on the user according to the identification information comprises:
sending instruction information instructing the user to provide identification to the user device;
receiving signature information of the user private key signature sent by the user device according to the instruction information; and
performing signature verification on the signature information according to the user public key, and determining that the identity verification is passed if the signature verification succeeds.

5. The method according to claim 4, wherein inquiring the identification information and the authorization information of the user in the blockchain according to the user identity information through the access server comprises:
when a plurality of blocks storing the identification information and the authorization information of the user are inquired in the blockchain by the access server by utilizing the user identity information, acquiring the identification information and the authorization information of the user from the latest block in the plurality of the blocks.

6. The method according to claim 4, wherein the identification information is a ciphertext of a password hash value, and the user identity information includes a user name and the password hash value;
inquiring the identification information and the authorization information of the user in the blockchain according to the user identity information through the access server comprises: seeking the corresponding ciphertext of the password hash value and the authorization information on the blockchain through the access server by utilizing the user name;
performing identity verification on the user according to the identification information comprises:
decrypting the ciphertext of the password hash value, and determining that the verification is passed if a plaintext obtained by decryption is consistent with the password hash value in the user identity information.

7. An authorization server, wherein the authorization server is a node in a blockchain network and stores a blockchain composed of a plurality of blocks, each block is used for storing authorization information, and the authorization server comprises:
a processor, a communication interface, a memory and a communication bus; the processor, the communication interface and the memory communicate with each other through the communication bus;
the memory is used for storing application programs;
the processor is used for performing the application program to implement the following method:
receiving a registration request message sent by a user device, wherein the registration request message includes identification information, and the identification information is used for performing identity verification on a user;

assigning authorization information to the user, wherein the authorization information is used to indicate a service that the user can access; and writing the identification information and the authorization information into the blocks of the blockchain through the authorization server.

8. The authorization server according to claim 7, wherein the identification information is a ciphertext of a password hash value; or the identification information is a user public key.

9. The authorization server according to claim 7, wherein the method implemented by the processor further comprises:

receiving an update message, wherein the update message is used for updating the authorization information corresponding to the identification information; and writing the identification information and the updated authorization information into the blocks of the blockchain through the authorization server.

10. An access server, wherein the access server is a node in a blockchain network, and the access server comprises:

a processor, a communication interface, a memory and a communication bus; the processor, the communication interface and the memory communicate with each other through the communication bus;

the memory is used for storing application programs;

the processor is used for performing the application program to implement the following method:

receiving an access request message sent by a user device, wherein the access request message includes user identity information;

inquiring identification information and authorization information of the user in the blockchain according to the user identity information through the access server;

performing identity verification on the user according to the identification information; and allowing the user to access the designated service according to the authorization information after the verification is passed, wherein the identification information is a user public key, and performing identity verification on the user according to the identification information comprises:

sending instruction information instructing the user to provide identification to the user device;

receiving signature information of the user private key signature sent by the user device according to the instruction information; and performing signature verification on the signature information according to the user public key, and determining that the identity verification is passed if the signature verification succeeds.

11. The access server according to claim 10, wherein inquiring the identification information and the authorization information of the user in the blockchain according to the user identity information through the access server comprises:

when a plurality of blocks storing the identification information and the authorization information of the user are inquired in the blockchain by the access server by utilizing the user identity information, acquiring the identification information and the authorization information of the user from the latest block in the plurality of the blocks.

12. The access server according to claim 10, wherein the identification information is a ciphertext of a password hash value, and the user identity information includes a user name and the password hash value;

inquiring the identification information and the authorization information of the user in the blockchain according to the user identity information through the access server comprises: seeking the corresponding ciphertext of the password hash value and the authorization information on the blockchain through the access server by utilizing the user name;

performing identity verification on the user according to the identification information comprises:

decrypting the ciphertext of the password hash value, and determining that the verification is passed if a plaintext obtained by decryption is consistent with the password hash value in the user identity information.

13. A non-transitory computer readable storage medium, wherein the non-transitory computer readable medium is used for storing a computer program, wherein the computer program comprises instructions for performing the following method:

receiving a registration request message sent by a user device, wherein the registration request message includes identification information, and the identification information is used for performing identity verification on a user;

assigning authorization information to the user, wherein the authorization information is used to indicate a service that the user can access; and writing the identification information and the authorization information into the blocks of the blockchain through the authorization server.

14. The non-transitory computer readable storage medium according to claim 13, wherein the computer program further comprises instructions for performing the following method:

receiving an update message, wherein the update message is used for updating the authorization information corresponding to the identification information; and writing the identification information and the updated authorization information into the blocks of the blockchain through the authorization server.

15. A non-transitory computer readable storage medium, wherein the non-transitory computer readable medium is used for storing a computer program, wherein the computer program comprises instructions for performing the following method:

receiving an access request message sent by a user device, wherein the access request message includes user identity information;

inquiring identification information and authorization information of the user in the blockchain according to the user identity information through the access server;

performing identity verification on the user according to the identification information; and allowing the user to access the designated service according to the authorization information after the verification is passed, wherein the identification information is a user public key, and performing identity verification on the user according to the identification information comprises:

sending instruction information instructing the user to provide identification to the user device;

receiving signature information of the user private key signature sent by the user device according to the instruction information; and performing signature verification on the signature information according to the user public key, and determining that the identity verification is passed if the signature verification succeeds.

16. The non-transitory computer readable storage medium according to claim 15, wherein inquiring the identification information and the authorization information of the user in the blockchain according to the user identity information through the access server comprises:
- when a plurality of blocks storing the identification information and the authorization information of the user are inquired in the blockchain by the access server by utilizing the user identity information, acquiring the identification information and the authorization information of the user from the latest block in the plurality of the blocks.

17. The non-transitory computer readable storage medium according to claim 15, wherein the identification information is a ciphertext of a password hash value, and the user identity information includes a user name and the password hash value;
- inquiring the identification information and the authorization information of the user in the blockchain according to the user identity information through the access server comprises:
- seeking the corresponding ciphertext of the password hash value and the authorization information on the blockchain through the access server by utilizing the user name;
- performing identity verification on the user according to the identification information comprises:
- decrypting the ciphertext of the password hash value, and determining that the verification is passed if a plaintext obtained by decryption is consistent with the password hash value in the user identity information.

* * * * *